(12) United States Patent
Ruano Alvarez et al.

(10) Patent No.: US 12,476,548 B2
(45) Date of Patent: Nov. 18, 2025

(54) APPARATUS FOR DELAY COMPENSATION FOR A POWER CONVERSION DEVICE

(71) Applicant: Lear Corporation, Southfield, MI (US)

(72) Inventors: Cesar Ruano Alvarez, Valls (ES); Roser Rue Olive, Valls (ES); Julia Gine Elies, Valls (ES); Youssef Ghabbour, Valls (ES); Ivan Casado Garcia, Valls (ES); Marc Ferrer Duran, Valls (ES)

(73) Assignee: LEAR CORPORATION, Southfield, MI (US)

( * ) Notice: Subject to any disclaimer, the term of this patent is extended or adjusted under 35 U.S.C. 154(b) by 223 days.

(21) Appl. No.: 18/220,056

(22) Filed: Jul. 10, 2023

(65) Prior Publication Data
US 2025/0023448 A1    Jan. 16, 2025

(51) Int. Cl.
H02M 3/335    (2006.01)

(52) U.S. Cl.
CPC ............................... H02M 3/33573 (2021.05)

(58) Field of Classification Search
CPC ................................................. H02M 3/33573
See application file for complete search history.

(56) References Cited

U.S. PATENT DOCUMENTS

| | | | |
|---|---|---|---|
| 9,041,366 B2 | 5/2015 | Nascimento et al. | |
| 11,043,843 B2 | 6/2021 | Rozgic et al. | |
| 2015/0280574 A1 | 10/2015 | Gong et al. | |
| 2021/0203239 A1* | 7/2021 | Karasawa | H02M 3/33592 |
| 2022/0077789 A1 | 3/2022 | Jimenez Pino et al. | |

FOREIGN PATENT DOCUMENTS

| | | | | |
|---|---|---|---|---|
| CN | 106712522 A | * | 5/2017 | |
| KR | 102471224 B1 | * | 11/2022 | ............ H02M 3/335 |
| WO | 2004107576 A1 | | 12/2004 | |
| WO | 2020163857 A1 | | 8/2020 | |

OTHER PUBLICATIONS

Translation of CN10712522A by Clarivate Analytics, Apr. 2025, 12 pages.*
Translation of KR102471224B1 by Clarivate Analytics, Apr. 2025, 12 pages.*

* cited by examiner

*Primary Examiner* — Harry R Behm
(74) *Attorney, Agent, or Firm* — BROOKS KUSHMAN P.C.

(57) ABSTRACT

In at least one embodiment, a system is provided. The system includes a first bridge circuit, at least one transformer, a second bridge circuit, and at least one controller. The first bridge circuit includes a first plurality of switches that receives a first voltage and provides a second voltage. The transformer provides a third voltage based on the second voltage. The second bridge circuit includes a second plurality of switches that provides a fourth voltage. The controller is programmed to selectively activate at least one of the first plurality of switches and at least one of the second plurality of switches based on a predetermined modulation scheme. The predetermined modulation scheme is based on at least a number of turns of the transformer, the predetermined modulation scheme minimizing a delay in selectively activating the first plurality of switches and the second plurality of switches.

20 Claims, 5 Drawing Sheets

APPARATUS FOR DELAY COMPENSATION FOR A POWER CONVERSION DEVICE

TECHNICAL FIELD

Aspects disclosed herein generally relate to an apparatus for delay compensation for a power conversion device. These aspects and others will be discussed in more detail herein.

DETAILED DESCRIPTION

Figure 1:
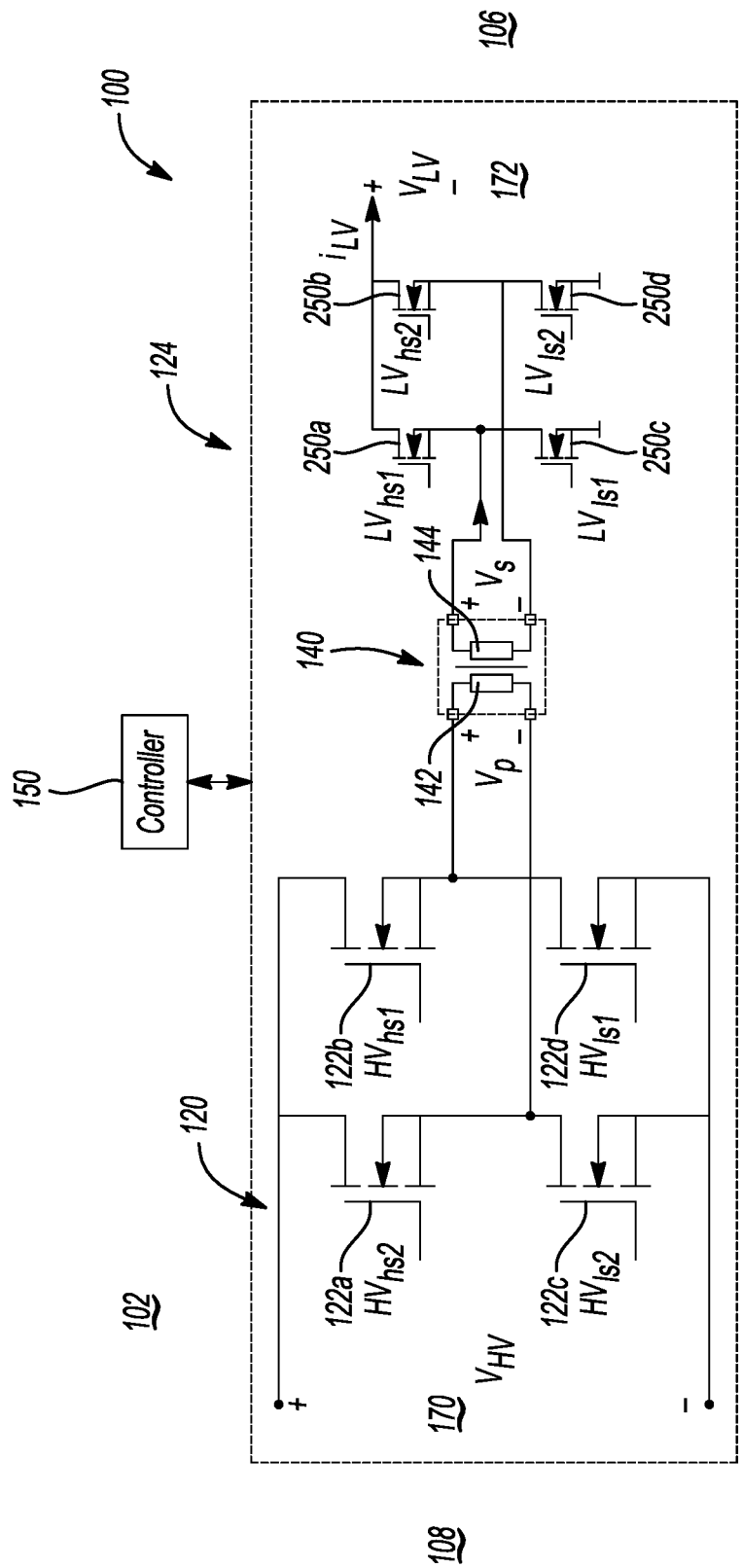
FIG. 1 depicts an apparatus for delay compensation for a power conversion device in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" and/or "at least one" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Aspects disclosed herein generally relate to an apparatus for delay compensation for a power conversion device. In one example, the power conversion device is an on-board charger (OBC) that includes a direct current (DC)/DC converter. In one example, the DC/DC converter is a dual active bridge (DAB) based DC/DC converter. The DC/DC converter converts a DC input voltage into a DC output voltage. In one operational mode, the DC/DC converter is a boost DC/DC converter that converts a DC input voltage with a DC input current into a higher DC output voltage with a lower DC output current. Conversely, in another operational mode, the DC/DC converter is a buck DC/DC converter converts a DC input voltage with a DC input current into a lower DC output voltage with a higher DC output current.

Generally, the DC/DC converter includes a set of input power switches, a transformer, and a set of output power switches. The input power switches are controlled to invert the DC input voltage into an AC input voltage. The transformer transforms the AC input voltage into an AC output voltage having a different voltage level. The output power switches are controlled to rectify the AC output voltage into the DC output voltage.

As examples, the DC/DC converters, as provided herein, may be configured to provide the following DC input/output pairings: 400-12; 48-12; 400-48; and 800-12. As such, for instance, a 400-12 V DC/DC converter may convert a 400 V DC input into a 12 V DC output. As such, the 400-12 V DC/DC converter is used, for example, between a 400 V DC network and a 12 V DC network to thereby connect these two voltage networks together. Of course, the DC/DC converters are usable over a number of voltage ranges. For example, the 400-12 V DC/DC converter may be used to convert a DC input voltage falling within a voltage range of 250-470 V DC into a DC output voltage into a 12 V DC output voltage.

A vehicle may have a high-voltage (HV) network and a low-voltage (LV) network. In this case, a DC/DC converter may be used to connect the HV and LV networks together. Consequently, a high DC input voltage of the HV network may be converted by the DC/DC converter into a low DC output voltage for use by loads connected to the LV network. Conversely, assuming the DC/DC converter is bidirectional, a low DC input voltage of the LV network may be converted by the DC/DC converter into a high DC output voltage for use by loads connected to the HV network. The switches that comprise the DAB based DC/DC converters generally operate at a switching frequency that is inversely proportional to the amount of power delivered by the DC/DC converter. A delay is inherently present in switching devices between the time such devices receive a switching command (or signal) and the time that the switching device is actuated or activated. Typically, implementations that attempt to minimize such a delay requires a component cost increase Aspects disclosed herein, generally, minimize delays attributed to switching devices while providing an efficiency improvement at low power transfer scenarios. In addition, the disclosed aspects provide a cost compromise on power switches. In addition, the disclosed aspects provide implementations, for example, that are applied in a variety H-bridge structures such as DC/DC converters and the overall OBC.

FIG. 1 depicts an apparatus 100 providing for delay compensation for a power conversion device 102 in accordance with one embodiment. In one example, the illustrated apparatus 100 is, a synchronous buck-boost DC/DC converter that transfers energy to and from a high voltage side and a low voltage side. In one example, the power conversion device 102 transfers energy to in a vehicle 106. In one example, the illustrated apparatus 100 is, a synchronous buck-boost DC/DC converter that is implemented as a portion of the OBC 102.

The DC/DC converter 100 generally includes a first bridge circuit 120 having a first plurality of switches 122a-122d (e.g., metal-oxide-semiconductor field-effect transistor (MOSFET) or other suitable variants thereof) positioned on a high voltage side of the vehicle 106. The DC/DC converter 100 also includes a second bridge circuit 124 having a second plurality of switches 250a-250d (e.g., metal-oxide-semiconductor field-effect transistor (MOSFET) or other suitable variants thereof) positioned on a low voltage (LV) side of the vehicle 106. A transformer 140 having a primary side (e.g., primary winding) 142 and a secondary side 144 (e.g., secondary winding) is also shown. The transformer 140 generally has n number of coil turns which provide the amount of voltage induced by the transformer 140. The first plurality of switches 122a-122d are coupled to the primary side 142 of the transformer 140. The first plurality of switches 122a-122d are implemented, for example, as a dual active bridge (DAB) circuit. The second plurality of switches 250a-250b are coupled to the secondary side 144 of the transformer 140. At least one controller 150 (hereafter "the controller 150") is provided that selectively activates and/or deactivates any one or more of the first plurality of switches 122a-122d and the second plurality of switches 250a-250d.

In general, the DC/DC converter 100 enables a bi-directional flow of energy. For example, the DC/DC converter 100 operates as a buck converter in a first mode to transfer energy from a high voltage battery to a low voltage battery. The controller 150 selectively activates/deactivates one or more of the first plurality of switches 122a-122d to generate a first DC based signal (e.g., first DC based pulse with modulated (PWM) signal) at a HV value. The transformer 140 steps down first DC based signal into a low voltage. The controller 150 selectively activates/deactivates the one or more of the second plurality of switches to reduces the voltage output provided from the transformer 140 to increase the current. The switches 122a-122d reduces the HV prior to receipt at the transformer 140.

In a boost mode (or the DC/DC converter 100 operates as a boost converter), the low voltage battery provides a low voltage DC signal to the second plurality of switches 250a-250d. The controller 150 selectively activates/deactivates second plurality of switches 250a-250d to increases the low voltage DC signal (e.g., as a PWM based DC signal) which is then provided to the transformer 140. The transformer 140 steps up the output of the to provide a stepped-up DC output signal. The controller 150 selectively activates/deactivates the first plurality of switches 122a-122d to modify the stepped-up DC output signal into the high voltage output signal (or $V_{HV}$) and to provide the same to the high voltage batteries.

As shown in FIG. 1, a first node 170 is formed at an input of the DC/DC converter 100 to receive the high voltage input ($V_{HV}$) from the high voltage battery(s). The first node 170 generally includes a high side (or positive rail shown as "+") and a low side (or negative rail shown as "−"). The switches 122a and 122b are coupled to the high side of the first node 170 and are generally defined as high voltage-high side switches. The switches 122c and 122d are coupled to the low side of the first node 170 and are generally defined as high voltage-low side switches. A second node 172 is formed at an output of the DC/DC converter 100 to provide the low voltage output ($V_{LV}$) to the low voltage battery(s). The second node 172 generally includes a high side (or positive rail shown as "+") and a low side (or negative rail shown as "−"). The switches 250a and 250b are coupled to the high side of the second node 172 and are generally defined as low voltage-high side switches. The switches 250c and 250d are coupled to the low side of the node 172 and are generally defined as low voltage-low side switches.

In general, a delay is present from the moment in which the controller 150 transmits a command to activate/deactivate any one or more of the first plurality of switches 122a-122d and any one or more of the second plurality of switches 250a-250d and when the one or more of the first plurality of switches 122a-122d and any one or more of the second plurality of switches 250a-250d are actually activated/deactivated. The controller 150 may employ a predetermined modulation scheme that selectively activates the one or more of the first plurality switches 122a-122d and the second plurality of switches 250a-250d to minimize the delay in selectively activating the one or more of the first plurality of switches 122a-122d and the one or more of the second plurality of switches 250a-250d.

For example, the controller 150 may control the first plurality of switches 122a-122d and the second plurality of switches 250a-250d based on the predetermined modulation scheme that is based on the following equations:

$$t1 = t2 * \alpha \quad \text{(Eq. 1)}$$

and $$\alpha = Vhv/nVlv \quad \text{(Eq. 2)}$$

$V_{HV}$ generally corresponds to the high voltage present at the first node 170, $V_{LV}$ generally corresponds to the low voltage present at the second node 172, and n corresponds to the number of turns of the transformer 140. Eq. 1 as shown above may be rewritten as follows:

$$t_1 = (t_2 + (LV_{ls\,rise\,delay} - LV_{hs\,rise\,delay})) * \alpha + \quad \text{(Eq. 3)}$$
$$(HV_{hs\,fall\,delay} - HV_{ls\,fall\,delay}))$$

$LV_{hs\,rise\,delay}$ (or the first rise time delay) generally corresponds to a first time period for the switch 250a or 250b (e.g., high side–low voltage switches (or the switches 250a and 250b as positioned on the positive rail)), when activated by the controller 150, to generate at least a portion of the low output voltage ($V_{LV}$).

LV Is rise delay (or the second rise time delay) generally corresponds to a second time period for the switch 250c or 250d (e.g., low side-low voltage switches (or the switches 250c and 250d as positioned on the negative rail)), when activated by the controller 150, to generate at least a portion of the low output voltage ($V_{LV}$). In one example, the first rise time delay and the second rise time delay are each approximately 75 ns. Such delays are generally attributed to driver delays associated with the switches 250a-250d.

$HV_{hs\,fall\,delay}$ (or the first fall time delay) generally corresponds to a first time period for the switch 122a or 122b (e.g., high side-high voltage switches (or the switches 122a or 122b as positioned on the positive rail)), when activated by the controller 150, to reduce at least a portion of the high output voltage ($V_{HV}$). In one example, the first fall time delay is approximately 100 ns. This delay may also be attributed to driver delays with the switches 122a or 122b.

$HV_{ls\,fall\,delay}$ (or the second fall time delay) generally corresponds to a second time period for the switch 122c or 122d (e.g., low side-high voltage switches (or the switches 122c or 122d as positioned on the negative rail)), when activated by the controller 150, to reduce at least a portion of the high output voltage ($V_{HV}$). The second fall time delay may be within the range of 220-330 ns. In this case, the delay may vary based on the final power output provided by the OBC 102 (e.g., 800 W-1600 W). In one example, the delay may be 220 ns when the OBC 102 provides a power output of up to 800 W. The controller 180 activates the switches 122a-122d and 250a-250d in light of at least a first envelope control signal (e.g., Ref_H+), a second envelope control signal (e.g., Ref_H−), a third envelope control signal (e.g., Ref_L) and further based on the corresponding values for t1 and t2 (e.g., see equations 1-3 as disclosed above). These aspects are generally shown, for example, at 200 in connection with FIG. 2 for the switches 122a-122d and at 260 in connection with FIG. 3 for the switches 250a-250d. One example in terms of the manner in which the controller 180 activates the switches 122a-122d and 250a-250d is set forth in International Publication No. WO 2020/163857 (or PCT/US2020/017468) ("the '468 application) filed on Feb. 10, 2020, which is hereby incorporated by reference in its entirety.

Figure 2:
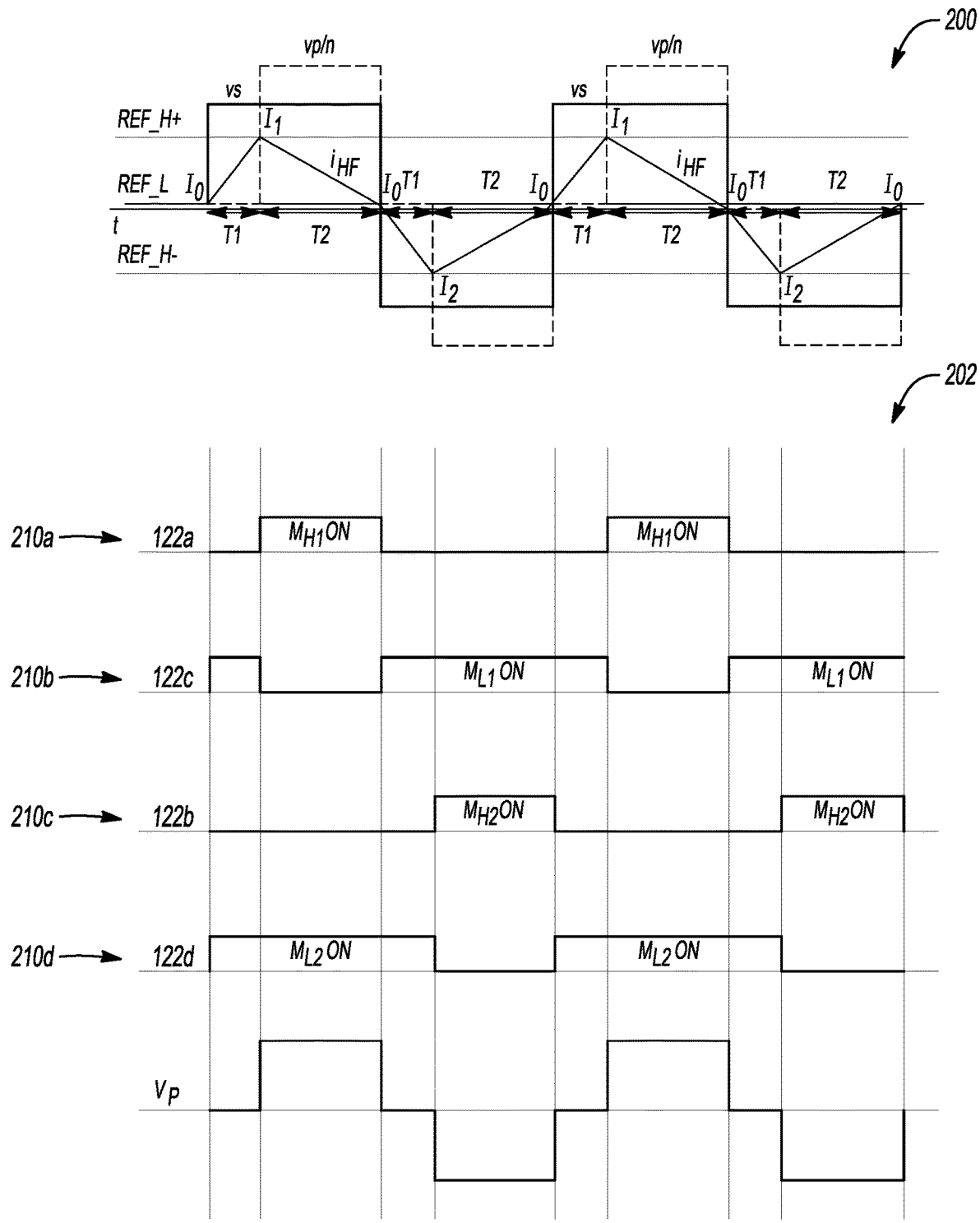
FIG. 2 depicts at least envelope signals utilized by the apparatus to selectively activate/deactivate a first plurality of switches on a high voltage side.
Figure 3:
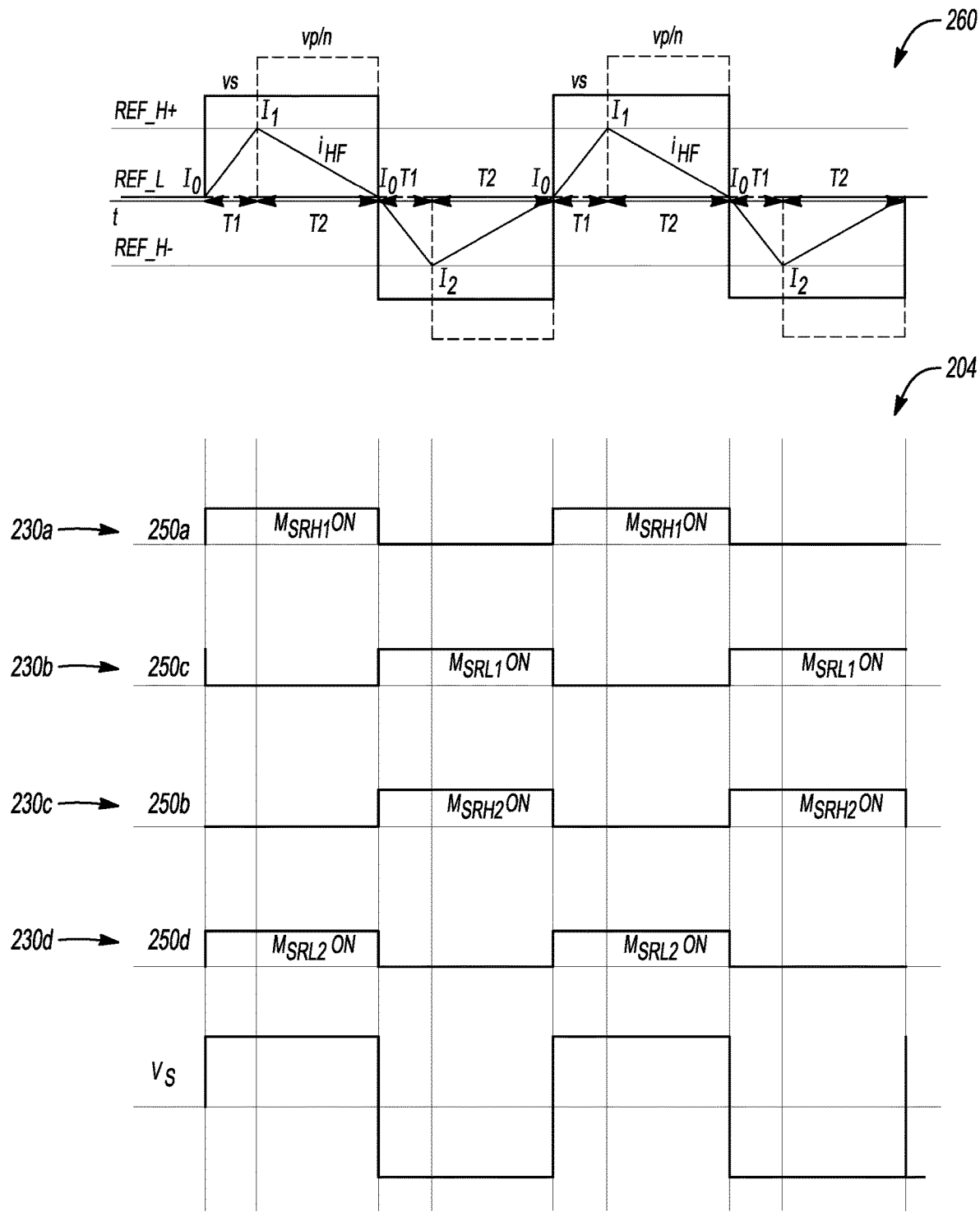
FIG. 3 depicts at least envelope signals utilized by the apparatus to selectively activate/deactivate a second plurality of switches on a low voltage side.

As generally shown at 202 in connection with FIG. 2, various outputs 210a-210d as generated by the controller 180 (e.g., flip flops) based at least on one or more of the first, second, and third envelope signals, and t1 (or T1) and t2 (or T2) as shown at 200 are provided to the switches 122a-122d on the primary side of the DC/DC converter 100 to selectively control the switches 122a-122d. It is recognized that t1 and t2 are now based on equations 1-3 as disclosed above to at least minimize switching delays attributed for the switches 122a-122d. Similarly, as generally shown at 204 in connection with FIG. 3, various outputs 230a-230d as generated by the controller 180 (e.g., flip flops) based at least on one or more of the first, second, and third envelope signals, and t1 and t2 as shown at 260 are provided to the switches 250a-250d on the secondary side of the DC/DC converter 100 to selectively control the switches 250a-250d. It is recognized that t1 and t2 are now based on equations 1-3 as disclosed above to at least minimize the switching delays for the switches 250a-250d.

Figure 4:
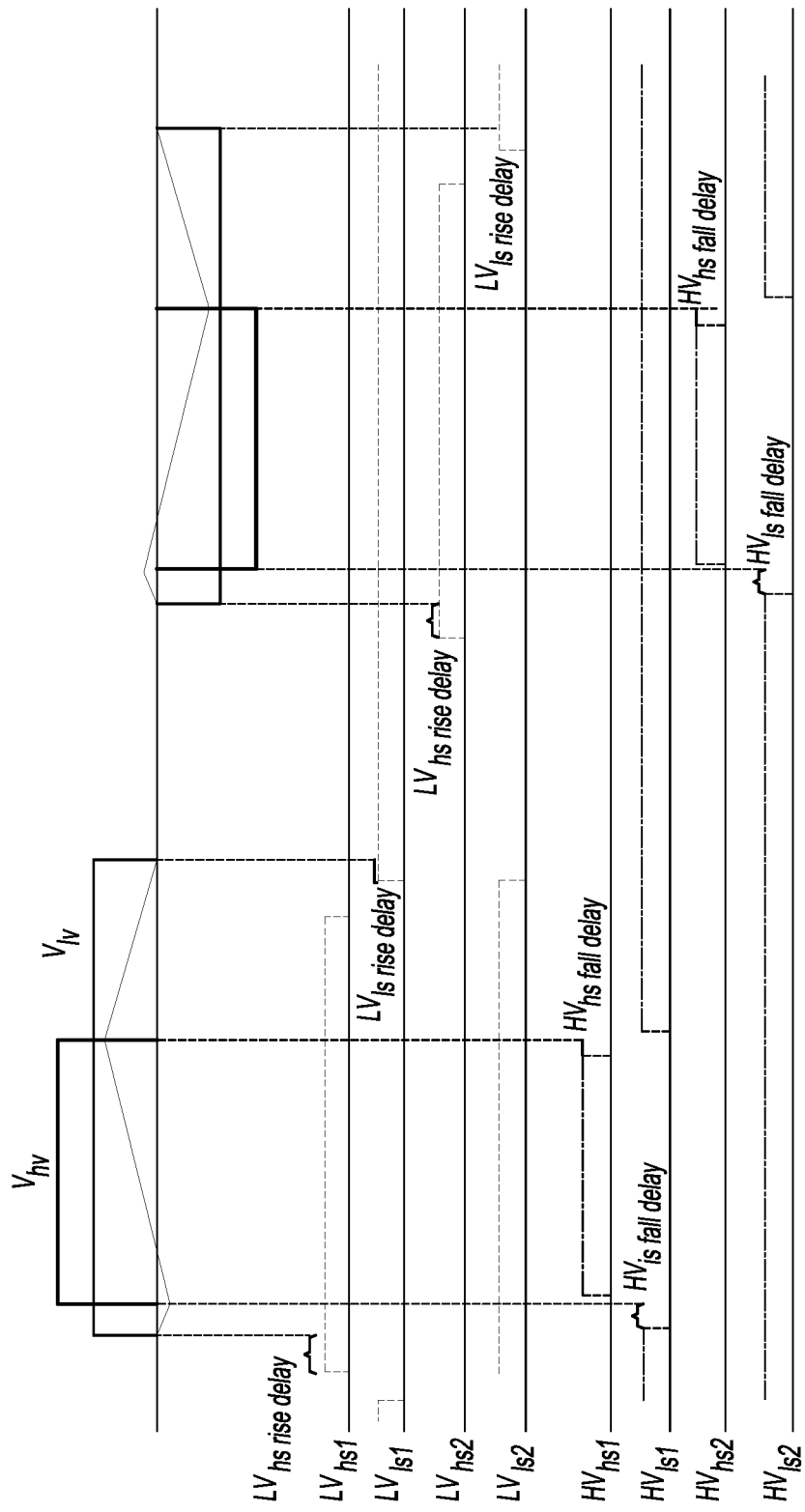
FIG. 4 is a plot that illustrates rise delays and fall delays attributed to a first plurality of switches and a second plurality of switches of the apparatus in accordance with one embodiment.

FIG. 4 is a plot that illustrates rise delays (e.g., $LV_{hs\,rise\,delay}$ (or the first rise time delay) and $LV_{ls\,rise\,delay}$ (or the second rise time delay)) and fall delays (e.g., $HV_{hs\,fall\,delay}$ (or the first fall time delay) $HV_{ls\,fall\,delay}$ (or the second fall time delay)) attributed to the first plurality of switches 122a-122d and the second plurality of switches 250a-250d of the apparatus 100 in accordance with one embodiment. In general, during the second fall time delay, a parasitic diode (not shown in FIG. 1) attributed to the switches 122c and 122d conducts a reverse current until energy is discharged and then the switch 122c and 122d (e.g., low side switches) are OFF and the respective voltage may be allowed to "rise" to $V_{HV}$ or $-V_{HV}$.

Figure 5:
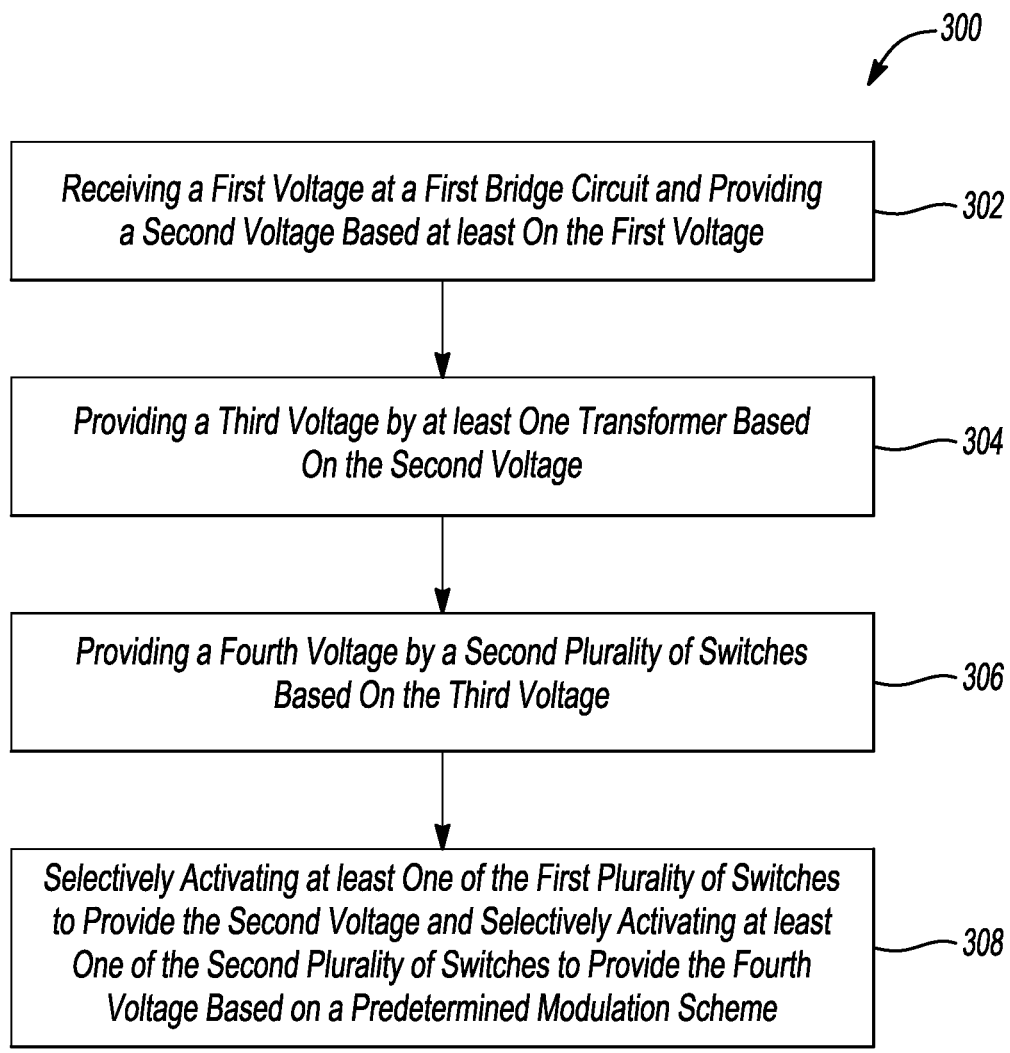
FIG. 5 depicts a method for providing delay compensation for a power conversion device in accordance with one embodiment.

FIG. 5 depicts a method 300 for providing delay compensation for the power conversion device 102 in accordance with one embodiment.

In operation 302, receiving a first voltage (e.g., $V_{HV}$), at the first bridge circuit 120 and providing a second voltage (e.g., Vp) based at least on the first voltage. In operation 304, providing a third voltage (e.g., Vs) by at least the one transformer 140 based on the second voltage. In operation 306, providing a fourth voltage (e.g., $V_{LV}$) by the second bridge circuit 124 (e.g., the second plurality of switches 250a-250d) based on the third voltage.

In operation 306, selectively activating the at least one of the first plurality of switches 122a-122d to provide the second voltage (e.g., Vp) and selectively activating the at least one of the second plurality of switches 250a-250d to provide the fourth voltage (e.g., $V_{LV}$), by the controller 150, based on the predetermined modulation scheme. The controller 150 employs the predetermined modulation scheme to minimize a delay in selectively activating the at least one of the first plurality of switches 122a-122d and the at least one of the second plurality of switches 250a-250d. The predetermined modulation scheme is based at least on the number of turns of the transformer 140. The controller 150 utilizes equations 1-3 as noted above to execute the predetermined modulation scheme.

Item 1: In one embodiment, the present disclosure provides a system that includes a first bridge circuit, at least one transformer, a second bridge circuit, and at least one controller. The first bridge circuit comprising a first plurality of switches, the first plurality of switches receiving a first voltage and providing a second voltage based on at least the first voltage. The at least one transformer providing a third voltage based on the second voltage. The second bridge circuit comprising a second plurality of switches, the second plurality of switches providing a fourth voltage based on at least the third voltage. The at least one controller is programmed to selectively activate at least one of the first plurality of switches, the at least one of the first plurality of switches, when activated, providing the second voltage and selectively activating at least one of the second plurality of switches, when activated, providing the fourth voltage based on a predetermined modulation scheme. The predetermined modulation scheme is based on at least a number of turns of the transformer, the predetermined modulation scheme minimizing a delay in selectively activating the at least one of the first plurality of switches and the at least one of the second plurality of switches.

Item 2: In another embodiment, the present disclosure provides the system of item 1, wherein the predetermined modulation scheme is further based at least on a ratio of the first voltage and the fourth voltage.

Item 3: In another embodiment, the present disclosure provides the system of item 1, wherein the predetermined modulation scheme is further based on at least a first rise time delay corresponding to a first period of time for a first switch of the second plurality of switches, when activated, generating a first portion of the fourth voltage.

Item 4: In another embodiment, the present disclosure provides the system of item 3, wherein the predetermined modulation scheme is further based on at least a second rise time delay corresponding to a second period of time for a second switch of the second plurality of switches, when activated, generating a second portion of the fourth voltage.

Item 5: In another embodiment, the present disclosure provides the system of item 4, wherein the at least one controller is further programmed to subtract the first rise time delay associated with the first switch of the second plurality of switches from the second rise time delay associated a second switch of the second plurality of switches, the at least one controller generating a first time value in response to subtracting the first rise time delay from the second rise time delay.

Item 6: In another embodiment, the present disclosure provides the system of item 5, wherein the predetermined modulation scheme is based at least on a product of the first predetermined value and at least the number of turns of the transformer.

Item 7: In another embodiment, the present disclosure provides the system of item 1, wherein the predetermined modulation scheme is further based on at least a first fall time delay corresponding to a first period of time for a first switch of the first plurality of switches, when activated, reducing a first portion of the first voltage to a first predetermined voltage.

Item 8: In another embodiment, the present disclosure provides the system of item 7, wherein the predetermined modulation scheme is further based on at least a second fall time delay corresponding to a second period of time for a second switch of the first plurality of switches, when activated, reducing a second portion of the first voltage to a second predetermined voltage.

Item 9: In another embodiment, the present disclosure provides the system of item 8, wherein the at least one controller is further programmed to subtract the first fall time delay associated with the first switch of the first plurality of switches from the second fall time delay associated the second switch, the at least one controller is further programmed to generate a first time value in response to subtracting the first fall time delay from the second fall time delay, the first time value forming at least a portion of the predetermined modulation scheme.

Item 10: In another embodiment, the present disclosure provides the system of item 1, wherein the first voltage is greater than the fourth voltage.

Item 11: In another embodiment, the present disclosure provides the system of item 10, wherein the second voltage is greater than the third voltage.

Item 12: In another embodiment, the present disclosure provides the system of item 1, wherein the first voltage is less than the fourth voltage.

Item 13: In another embodiment, the present disclosure provides the system of item 12, wherein the second voltage is less than the third voltage.

Item 14: In one embodiment, the present disclosure provides a system that includes a first plurality of switches, at least one transformer, a second plurality of switches, and at least one controller. The first plurality of switches receiving a first voltage and providing a second voltage based on at least the first voltage. The at least one transformer providing a third voltage based on the second voltage. The second plurality of switches providing a fourth voltage based on at least the third voltage. The at least one controller is programmed to selectively activate at least one of the first plurality of switches, the at least one of the first plurality of switches, when activated, providing the second voltage and selectively activating at least one of the second plurality of switches, when activated, providing the fourth voltage based on a predetermined modulation scheme. The predetermined modulation scheme is based on at least a number of turns of the transformer, the predetermined modulation scheme minimizing a delay in selectively activating the at least one of the first plurality of switches and the at least one of the second plurality of switches.

Item 15: In another embodiment, the present disclosure provides the system of item 14, wherein the first voltage is greater than the fourth voltage.

Item 16: In another embodiment, the present disclosure provides the system of item 15, wherein the second voltage is greater than the third voltage.

Item 17: In another embodiment, the present disclosure provides the system of item 14, wherein the first voltage is less than the fourth voltage.

Item 18: In another embodiment, the present disclosure provides the system of item 17, wherein the second voltage is less than the third voltage.

Item 19: In one embodiment, the present disclosure provides a system that includes a first bridge circuit, at least one transformer, a second bridge circuit, and at least one controller. The first bridge circuit comprising a first plurality of switches, the first plurality of switches receiving a first voltage and providing a second voltage based on at least the first voltage. The at least one transformer providing a third voltage based on the second voltage. The second bridge circuit comprising a second plurality of switches, the second plurality of switches providing a fourth voltage based on at least the third voltage. The at least one controller is programmed to selectively activate at least one of the first plurality of switches, the at least one of the first plurality of switches, when activated, providing the second voltage and selectively activating at least one of the second plurality of switches, when activated, providing the fourth voltage based on a predetermined modulation scheme. The predetermined modulation scheme minimizing a delay in selectively activating the at least one of the first plurality of switches and the at least one of the second plurality of switches. The predetermined modulation scheme is based on at least one or more of a number of turns of the transformer and a ratio of the first voltage and the fourth voltage.

Item 20: In another embodiment, the present disclosure provides the system of item 19, wherein the first voltage is greater than the fourth voltage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:
    a first bridge circuit comprising a first plurality of switches, the first plurality of switches receiving a first voltage and providing a second voltage based on at least the first voltage;
    at least one transformer, the at least one transformer providing a third voltage based on the second voltage;
    a second bridge circuit comprising a second plurality of switches, the second plurality of switches providing a fourth voltage based on at least the third voltage; and
    at least one controller programmed to selectively activate at least one of the first plurality of switches, the at least one of the first plurality of switches, when activated, providing the second voltage and selectively activating at least one of the second plurality of switches, when activated, providing the fourth voltage based on a predetermined modulation scheme, wherein the predetermined modulation scheme is based on at least a number of turns of the at least one transformer and a difference between a first rise time delay associated with a first switch of the second plurality of switches and a second rise time delay associated with a second switch of the second plurality of switches.

2. The system of claim 1, wherein the predetermined modulation scheme is further based at least on a ratio of the first voltage and the fourth voltage.

3. The system of claim 1, wherein the first rise time delay corresponds to a first period of time for the first switch of the second plurality of switches, when activated, is adapted to generate a first portion of the fourth voltage.

4. The system of claim 3, wherein the second rise time delay corresponds to a second period of time for the second switch of the second plurality of switches, when activated, is adapted to generate a second portion of the fourth voltage.

5. The system of claim 4, wherein the at least one controller is adapted to generate a first-time value in response to subtracting the first rise time delay from the second rise time delay.

6. The system of claim 5, wherein the predetermined modulation scheme is based at least on a product of a first predetermined value and at least the number of turns of the at least one transformer.

7. The system of claim 1, wherein the predetermined modulation scheme is further based on at least a first fall time delay corresponding to a first period of time for a first switch of the first plurality of switches, when activated, reducing a first portion of the first voltage to a first predetermined voltage.

8. The system of claim 7, wherein the predetermined modulation scheme is further based on at least a second fall time delay corresponding to a second period of time for a second switch of the first plurality of switches, when activated, reducing a second portion of the first voltage to a second predetermined voltage.

9. The system of claim 8, wherein the at least one controller is further programmed to subtract the first fall time delay associated with the first switch of the first plurality of switches from the second fall time delay associated the second switch, the at least one controller is further programmed to generate a first time value in response to subtracting the first fall time delay from the second fall time delay, the first time value forming at least a portion of the predetermined modulation scheme.

10. The system of claim 1, wherein the first voltage is greater than the fourth voltage.

11. The system of claim 10, wherein the second voltage is greater than the third voltage.

12. The system of claim 1, wherein the first voltage is less than the fourth voltage.

13. The system of claim 12, wherein the second voltage is less than the third voltage.

14. A system, comprising:
    a first plurality of switches, the first plurality of switches receiving a first voltage and providing a second voltage based on at least the first voltage;
    at least one transformer, the at least one transformer providing a third voltage based on the second voltage;
    a second plurality of switches, the second plurality of switches providing a fourth voltage based on at least the third voltage; and
    at least one controller programmed to selectively activate at least one of the first plurality of switches, the at least one of the first plurality of switches, when activated, providing the second voltage and selectively activating at least one of the second plurality of switches, the at least one of the second plurality of switches, when activated, providing the fourth voltage based on a predetermined modulation scheme, wherein the predetermined modulation scheme is based on at least a number of turns of the at least one transformer and a difference between a first rise time delay associated with a first switch of the second plurality of switches and a second rise time delay associated with a second switch of the second plurality of switches.

15. The system of claim 14, wherein the first voltage is greater than the fourth voltage.

16. The system of claim 15, wherein the second voltage is greater than the third voltage.

17. The system of claim 14, wherein the first voltage is less than the fourth voltage.

18. The system of claim 17, wherein the second voltage is less than the third voltage.

19. A system, comprising:
    a first bridge circuit comprising a first plurality of switches, the first plurality of switches receiving a first voltage and providing a second voltage based on at least the first voltage;
    at least one transformer, the at least one transformer providing a third voltage based on the second voltage;
    a second bridge circuit comprising a second plurality of switches, the second plurality of switches providing a fourth voltage based on at least the third voltage; and
    at least one controller programmed to selectively activate at least one of the first plurality of switches, the at least one of the first plurality of switches, when activated, providing the second voltage and selectively activating at least one of the second plurality of switches, the at least one of the second plurality of switches, when activated, providing the fourth voltage based on a predetermined modulation scheme, wherein the predetermined modulation scheme is based on:
a number of turns of the at least one transformer;
a ratio of the first voltage and the fourth voltage; and
a difference between a first rise time delay associated with a first switch of the second plurality of switches and a second rise time delay associated with a second switch of the second plurality of switches.

20. The system of claim 19, wherein the first voltage is different from the fourth voltage.

* * * * *